United States Patent
Lo et al.

(10) Patent No.: US 11,671,142 B2
(45) Date of Patent: Jun. 6, 2023

(54) ELECTROMAGNETIC INTERFERENCE CANCELLATION FOR WIRELINE RECEIVERS, WITH SAFETY FUNCTION

(71) Applicant: Axonne Inc., Sunnyvale, CA (US)

(72) Inventors: William Lo, Cupertino, CA (US); Hiroshi Takatori, Sacramento, CA (US); Kenneth Thet Zin Oo, San Ramon, CA (US)

(73) Assignee: Axonne Inc., Sunnyvale, CA (US)

( * ) Notice: Subject to any disclaimer, the term of this patent is extended or adjusted under 35 U.S.C. 154(b) by 158 days.

(21) Appl. No.: 17/152,758

(22) Filed: Jan. 19, 2021

(65) Prior Publication Data
US 2022/0231726 A1     Jul. 21, 2022

(51) Int. Cl.
    *H04B 3/30*     (2006.01)
    *H04B 1/403*     (2015.01)
    *H04B 1/30*     (2006.01)

(52) U.S. Cl.
    CPC .............. *H04B 3/30* (2013.01); *H04B 1/30* (2013.01); *H04B 1/406* (2013.01)

(58) Field of Classification Search
    CPC ... H04B 3/30; H04B 3/32; H04B 1/30; H04B 1/40; H04B 1/406
    See application file for complete search history.

(56) References Cited

U.S. PATENT DOCUMENTS

| | | | | |
|---|---|---|---|---|
| 5,258,951 A * | 11/1993 | Yu | ............ | G11C 7/1057 365/189.08 |
| 6,260,167 B1 * | 7/2001 | Lo | ............ | H04L 43/50 714/744 |
| 6,377,512 B1 * | 4/2002 | Hamamoto | ............ | G11C 8/12 365/207 |
| 6,522,699 B1 * | 2/2003 | Anderson | ............ | H04L 25/03057 375/295 |
| 6,683,913 B1 * | 1/2004 | Kantschuk | ............ | H04B 1/123 375/349 |
| 7,072,617 B1 * | 7/2006 | Gupta | ............ | H03G 3/3052 330/149 |
| 7,248,635 B1 * | 7/2007 | Arneson | ............ | H04L 25/0278 333/155 |
| 7,266,465 B1 * | 9/2007 | Tsui | ............ | G01R 23/12 702/77 |
| 7,593,494 B1 * | 9/2009 | Ghobrial | ............ | H04B 3/30 375/350 |
| 7,659,981 B2 * | 2/2010 | Lo | ............ | G01R 31/307 356/369 |

(Continued)

*Primary Examiner* — James M Perez
(74) *Attorney, Agent, or Firm* — Fenwick & West LLP (57) ABSTRACT

Embodiments of the present disclosure utilizes the natural properties of RFI noise on a wireline link. Since differential RFI noise in the system has some correlation with the common mode noise on the cable, a replica of RFI noise can be regenerated by an adaptive filter based on information about the common mode noise. The replica RFI is subtracted from the equalizer output prior to the data decision circuitry or slicer. In this method, the system does not require expensive cable, nor does the equalizer suffer additional loss due to an RFI notch filter. Since RFI can be detected and mitigated, this information can also be coupled to safety systems to increase functional safety under high EMI conditions.

20 Claims, 8 Drawing Sheets

(56) References Cited

U.S. PATENT DOCUMENTS

| | | | | |
|---|---|---|---|---|
| 7,809,076 B1* | 10/2010 | Ghobrial | H04L 25/03885 | 375/296 |
| 8,315,301 B1* | 11/2012 | He | H04L 25/03057 | 375/233 |
| 8,331,508 B2* | 12/2012 | Dabiri | H03H 21/0021 | 375/348 |
| 8,442,099 B1* | 5/2013 | Sederat | H04B 3/32 | 375/220 |
| 8,792,597 B2* | 7/2014 | Malkin | H04B 3/30 | 455/226.1 |
| 9,166,651 B2* | 10/2015 | Alloin | H04B 3/487 | |
| 9,172,498 B2* | 10/2015 | Takatori | H04L 1/24 | |
| 9,413,424 B2* | 8/2016 | Alloin | H04B 3/46 | |
| 9,590,695 B1* | 3/2017 | Sederat | H04B 3/32 | |
| 9,641,286 B2* | 5/2017 | Takatori | H04L 1/0042 | |
| 9,660,695 B2* | 5/2017 | Alloin | H04B 3/46 | |
| 9,716,529 B1* | 7/2017 | Dai | H04L 25/03885 | |
| 10,523,472 B1* | 12/2019 | Zhao | H04L 25/0328 | |
| 11,070,409 B2* | 7/2021 | Lo | H04L 7/02 | |
| 11,165,718 B2* | 11/2021 | Lo | H04L 49/20 | |
| 11,171,815 B2* | 11/2021 | Sun | H04L 25/03057 | |
| 11,398,931 B2* | 7/2022 | Wu | H04L 25/03057 | |
| 11,411,604 B2* | 8/2022 | Fung | H04L 27/144 | |
| 11,424,776 B2* | 8/2022 | Oo | H04B 1/16 | |
| 11,522,739 B2* | 12/2022 | Lo | H04B 3/50 | |
| 2001/0050987 A1* | 12/2001 | Yeap | G10L 21/0208 | 379/399.01 |
| 2003/0016770 A1* | 1/2003 | Trans | H04B 3/32 | 375/346 |
| 2006/0182014 A1* | 8/2006 | Lusky | H04B 3/23 | 370/252 |
| 2007/0031011 A1* | 2/2007 | Erhart | G06V 40/1335 | 382/124 |
| 2007/0046947 A1* | 3/2007 | Lo | G01R 31/307 | 356/492 |
| 2007/0237270 A1* | 10/2007 | Mezer | H04L 25/03878 | 375/346 |
| 2008/0267212 A1* | 10/2008 | Crawley | H05K 9/0066 | 370/463 |
| 2008/0316930 A1* | 12/2008 | Xu | G01R 31/52 | 370/242 |
| 2009/0128161 A1* | 5/2009 | Xu | G06F 11/24 | 324/539 |
| 2009/0245448 A1* | 10/2009 | Ran | H04L 25/03057 | 375/373 |
| 2011/0296267 A1* | 12/2011 | Malkin | H04L 5/16 | 375/350 |
| 2011/0310936 A1* | 12/2011 | Malkin | H04B 15/00 | 375/219 |
| 2012/0002711 A1* | 1/2012 | Kota | H04B 15/00 | 375/232 |
| 2012/0063295 A1* | 3/2012 | Bliss | H04L 41/0672 | 370/242 |
| 2013/0016798 A1* | 1/2013 | Velazquez | H04L 25/14 | 341/155 |
| 2013/0028299 A1* | 1/2013 | Tsai | H03M 13/4107 | 375/219 |
| 2013/0259155 A1* | 10/2013 | Takatori | H04L 25/03343 | 375/296 |
| 2014/0177694 A1* | 6/2014 | Alloin | H04B 3/46 | 375/227 |
| 2014/0281668 A1* | 9/2014 | He | G06F 1/3253 | 714/4.5 |
| 2015/0280870 A1* | 10/2015 | Takatori | H04L 1/244 | 375/227 |
| 2016/0043772 A1* | 2/2016 | Alloin | H04B 3/46 | 375/227 |
| 2016/0308580 A1* | 10/2016 | Alloin | H04B 3/487 | |
| 2017/0019146 A1* | 1/2017 | Jin | H04B 1/0475 | |
| 2017/0019241 A1* | 1/2017 | Jin | H04B 3/32 | |
| 2017/0019242 A1* | 1/2017 | Jin | H04B 3/487 | |
| 2017/0187418 A1* | 6/2017 | Dafesh | H04B 1/719 | |
| 2018/0287770 A1* | 10/2018 | Barr | H04L 12/2898 | |
| 2021/0105160 A1* | 4/2021 | Lo | H04L 1/0041 | |
| 2021/0281289 A1* | 9/2021 | Fung | H04B 3/32 | |
| 2022/0052731 A1* | 2/2022 | Legg | H04B 7/0695 | |
| 2022/0231715 A1* | 7/2022 | Oo | H04B 1/1027 | |
| 2022/0231726 A1* | 7/2022 | Lo | H04B 3/30 | |

* cited by examiner

ELECTROMAGNETIC INTERFERENCE CANCELLATION FOR WIRELINE RECEIVERS, WITH SAFETY FUNCTION

BACKGROUND

1. Technical Field

This disclosure relates generally to mitigation of electromagnetic interference in wireline receivers.

2. Description of Related Art

In this increasingly digital world that we live in, data proliferation has exploded exponentially and with it comes the need to increase the data rates in both wireless and wireline communications. Wireline communication typically uses baseband transmission which sends digital signals over a media channel such as an electrical physical link with transmissions themselves taking the form of electrical pulses. Since baseband transmission is broadband in nature and occupies the entire bandwidth, its operation starts to encroach into various radio-frequency (RF), microwave and radar ranges as its signaling speed reaches high mega-hertz (MHz) and multi-giga-hertz (GHz) rates.

This increasing encroachment of digital baseband transmission into RF and microwave bands posts challenges in meeting electromagnetic compliance (EMC) for both emission and immunity points of view. Most digital data transmissions have some level of inherent robustness for electromagnetic interference (EMI), also called radio-frequency interference (RFI) when in the radio frequency spectrum, due to the use of differential signaling which is based on interpreting two identical coupled wires to discern a data symbol. From the emission point of view, differential signaling cancels emission of each wire due to opposite phases of signaling. From the immunity point of view, EMI energy appears as a common-mode noise for the differential signal, thus the receiver does not see the interference.

However, the quality of the transmission signals could degrade rapidly and become susceptible to EMC issues at higher data rates due to severe signal attenuation and mode conversions suffered from imbalance in the differential components along the signal path. The EMC issues become more pronounced in an unshielded transmission medium.

EMI in the form of radio waves, also known as RFI, is typically a modulated signal around a carrier frequency. The baseband receiver may suffer long periods of high bit error rates if the carrier signal couples into the media and does not go away. If the baseband receiver uses adaptive equalization, prolonged interference may cause the adaptive equalizer to drift from its optimal setting. Hence it is possible that after the RFI stops there may be a period where bit errors continue because of sub-optimal receiver equalization.

Prolonged RFI may also pose safety issues in safety critical applications such as autonomous driving where a steady stream of uncorrupted video or other data is required to maintain safe operation. A system that can detect the onset of RFI or other types of EMI and compensate for it adds a level of functional safety to the overall system.

One approach to mitigate EMC issues in a wireline link is to use a high quality cable. However, this increases the system cost and is not a preferred solution in cost sensitive systems. Also, it is technically difficult to maintain high quality cable in many applications such as automotive. This is due to the system environment, such as vibrations, repetitive cable bending, aging degradation, and temperature changes.

Another approach is to place an in-line common mode choke. A common mode choke (CMC) can be effective to reduce common mode signal by 20 to 30 dB. However, it does not reduce EMI that has already been converted by the cable to a differential signal. Also, the CMC itself converts common mode signal (e.g., RFI noise) to differential signal. These are drawbacks that limit the effectiveness of CMC.

A third method is the use of a notch filter. This method applies a notch filter that attenuates RFI noise of a specific frequency in the equalizer. It requires frequency detection of the RFI noise and adaptation to it. The notch filter, however, also attenuates signal at the same frequency. Hence, there is some degradation (lower SNR) when the notch filter is applied.

Thus, there is a need for better approaches to reduce the effects of EMI.

SUMMARY

Certain embodiments of the present disclosure utilize the natural properties of RFI noise. Since differential RFI noise in the system has some correlation with the common mode noise on the cable, a replica of RFI noise can be regenerated by an adaptive filter if information about the common mode noise can be extracted. The replica RFI is subtracted from the equalizer output prior to the data decision circuitry or slicer. In this approach, the system does not require expensive cable, nor does the equalizer suffer additional loss due to an RFI notch filter. Since RFI can be detected and mitigated, this information can also be coupled to safety systems to increase functional safety under high EMI conditions.

In one aspect, a receiver chip for wireline communication includes a baseband receiver and EMI cancellation circuitry coupled to the baseband receiver. The baseband receiver receives an input signal transmitted over a wireline link. The input signal is encoded with digital data and the baseband receiver recovers the digital data from the received input signal. However, the input signal may also carry EMI. The EMI cancellation circuitry produces an EMI cancellation signal from the received input signal, for example an estimated replica of the EMI noise. The baseband receiver receives the EMI cancellation signal and uses the EMI cancellation signal to reduce the effect of the EMI on the data recovery process.

In another aspect, the receiver chip includes EMI monitoring circuitry and safety circuitry. The EMI monitoring circuitry produces an EMI detection signal from the received input signal. The EMI detection signal indicates the presence of EMI in the received input signal. The safety circuitry alters operation of the baseband receiver depending on whether or not EMI is present.

For receiver chips that implement both EMI cancellation and EMI detection, the EMI cancellation circuitry and the EMI monitoring circuitry may be overlapping or even the same. Signals produced as part of EMI cancellation may be used advantageously to implement safety functions that are based on EMI presence or strength of EMI. The EMI detection signal may be derived from the EMI cancellation signal. For example, the EMI detection signal can be set to EMI detected, if the EMI cancellation signal exceeds a threshold.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
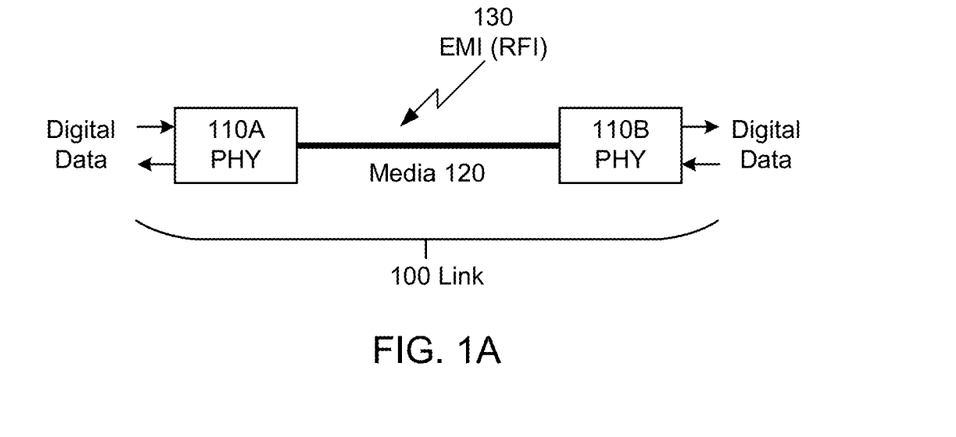
FIG. 1A is a block diagram illustrating electromagnetic interference (EMI) on a wireline communications link.

FIG. 1A is a block diagram illustrating electromagnetic interference (EMI) on a wireline communications link 100. The communications link 100 shown in FIG. 1A is bidirectional and includes two transceivers 110A, 110B connected by a wireline link 120. Each transceiver 110 includes a transmitter and a receiver. Digital data is transmitted from one transceiver 110A/B to the other transceiver 110B/A over the wireline link 120. Electromagnetic interference (EMI) 130 may couple into the physical media 120. The wireline communication uses baseband transmission which sends digital signals over the media channel 120 using pulses. Since baseband transmission is broadband in nature, high data rate transmission can reach the RF and microwave frequency ranges. EMI 130, including RFI at RF frequencies, may be generated by various sources within the operating bandwidth of the transmitted signal. If coupled into the physical media 120, these will manifest themselves as noise at the receiver. Each receiver receives an input signal that is a combination of the desired signal and noise (EMI). The receiver recovers the digital data from the received input signal.

Figure 1B:
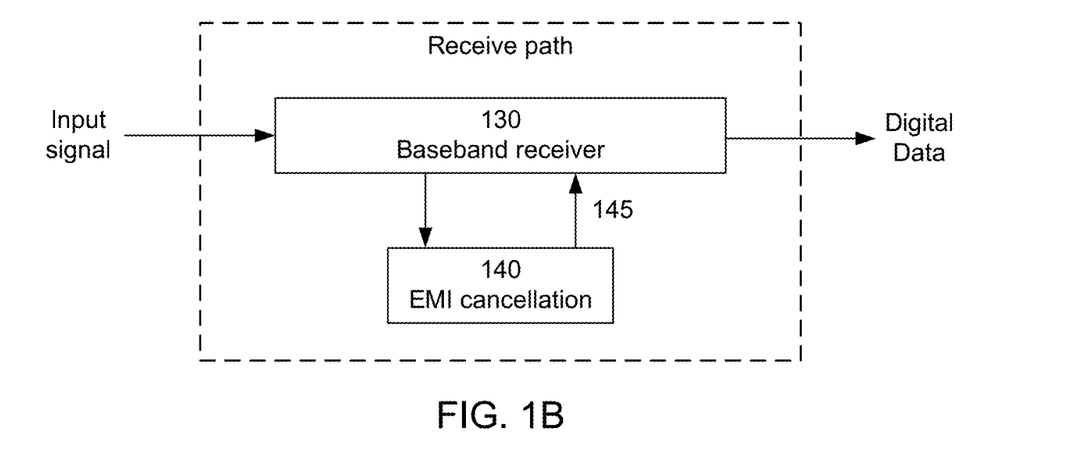
FIG. 1B is a block diagram of a baseband receiver with EMI mitigation.

FIG. 1B is a block diagram of a receiver that mitigates the effect of this EMI. The receive path is the receive portion of a transceiver 110. It includes a baseband receiver 130 and EMI cancellation circuitry 140. The baseband receiver 130 receives the input signal from the wireline link 120 and recovers the encoded digital data. The EMI cancellation circuitry 140 produces a signal 145 from the received input signal. This signal 145 is based upon the EMI in the input signal. For example, it may be a replica or an estimate of the EMI in the input signal. The baseband receiver 130 uses the signal 145 to mitigate the effects of EMI on the process for recovering the digital data. For example, if the signal 145 is a replica of the EMI, then it may be used to cancel the EMI in the input signal. For convenience, signal 145 will be referred to as the EMI cancellation signal.

The EMI cancellation approaches described in this disclosure may be applied to many types of communications links 100. For example, the link 100 may be bidirectional or unidirectional, in which case each terminal 110 may include only a transmitter, only a receiver or both transmitter and receiver. The media 120 typically is an electrical cable. Examples include coaxial cable, twisted pair, parallel pair, and backplane. Cable pairs may be shielded or unshielded. Example data rates include 1 G (Gbps), 2.5 G, 5 G, 10 G and higher. Link lengths can vary widely. For example, typical automotive cabling is up to 15 meters in the standards, in many actual cases shorter. Regular Ethernet is specified up to 100 meters. Note that the longer the cable, the more susceptible it is, because the desired signal attenuates more over a longer length and a longer cable presents more opportunity for unwanted coupling. Many different protocols may be used, for example 1000BASE-T1, 2.5GBASE-T1, 5GBASE-T1, 10GBASE-T1, 1000BASE-T, 2.5GBASE-T, 5GBASE-T, 10GBASE-T, and MIPI APHY. There are also many different end use applications. One example is automotive networking. Other examples include industrial Ethernet, and enterprise and data centers. 5G wireless towers today may have Ethernet and other baseband close to strong radio sources. For enterprise and data center closets, security walkie-talkie and cell phone could cause interference. RFI is especially problematic for automotive and industrial applications. Aviation applications are another example application.

Figure 2A:
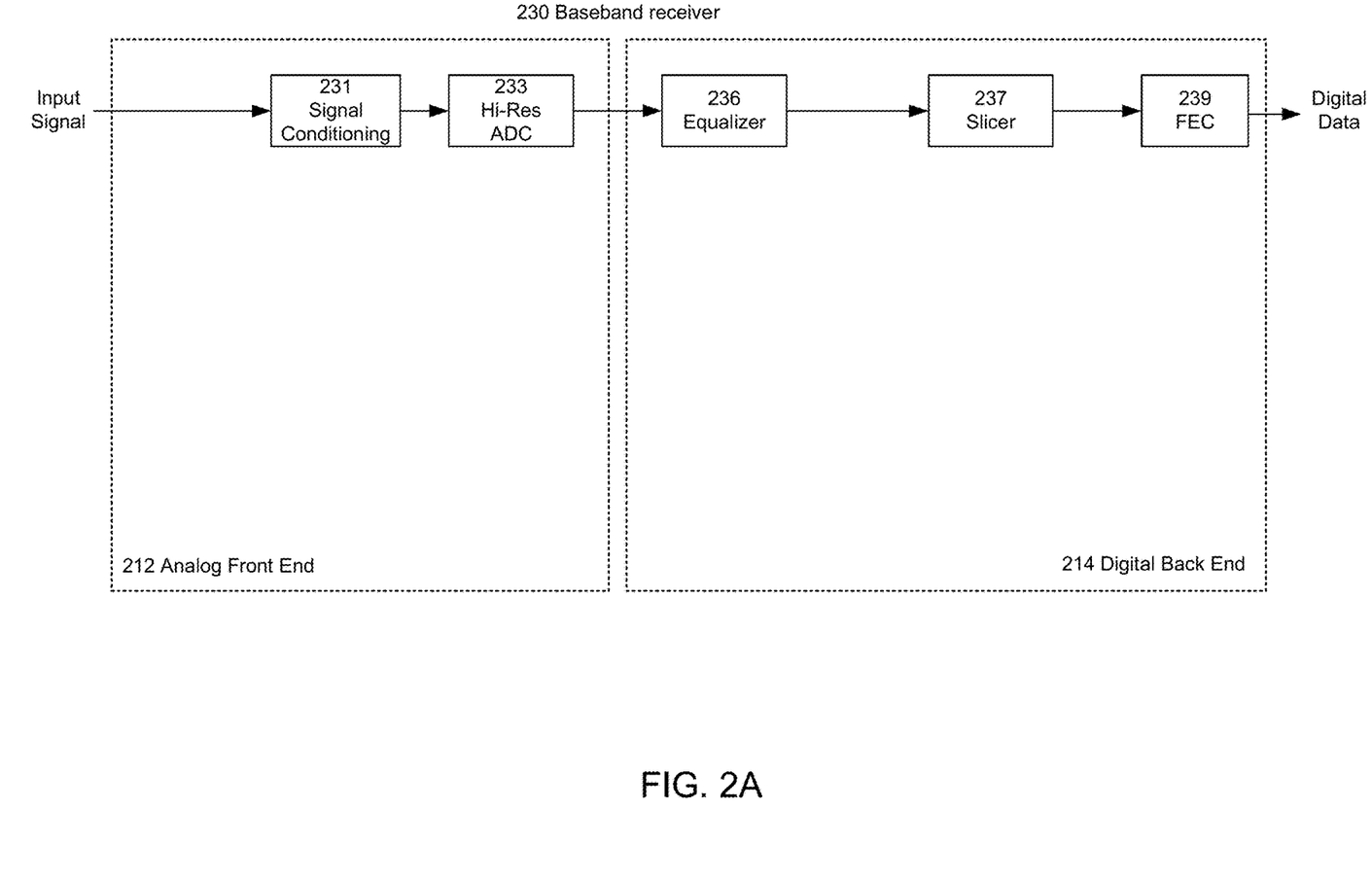
FIGS. 2A-2C are block diagrams of an example implementation of a baseband receiver with EMI mitigation.
Figure 2B:
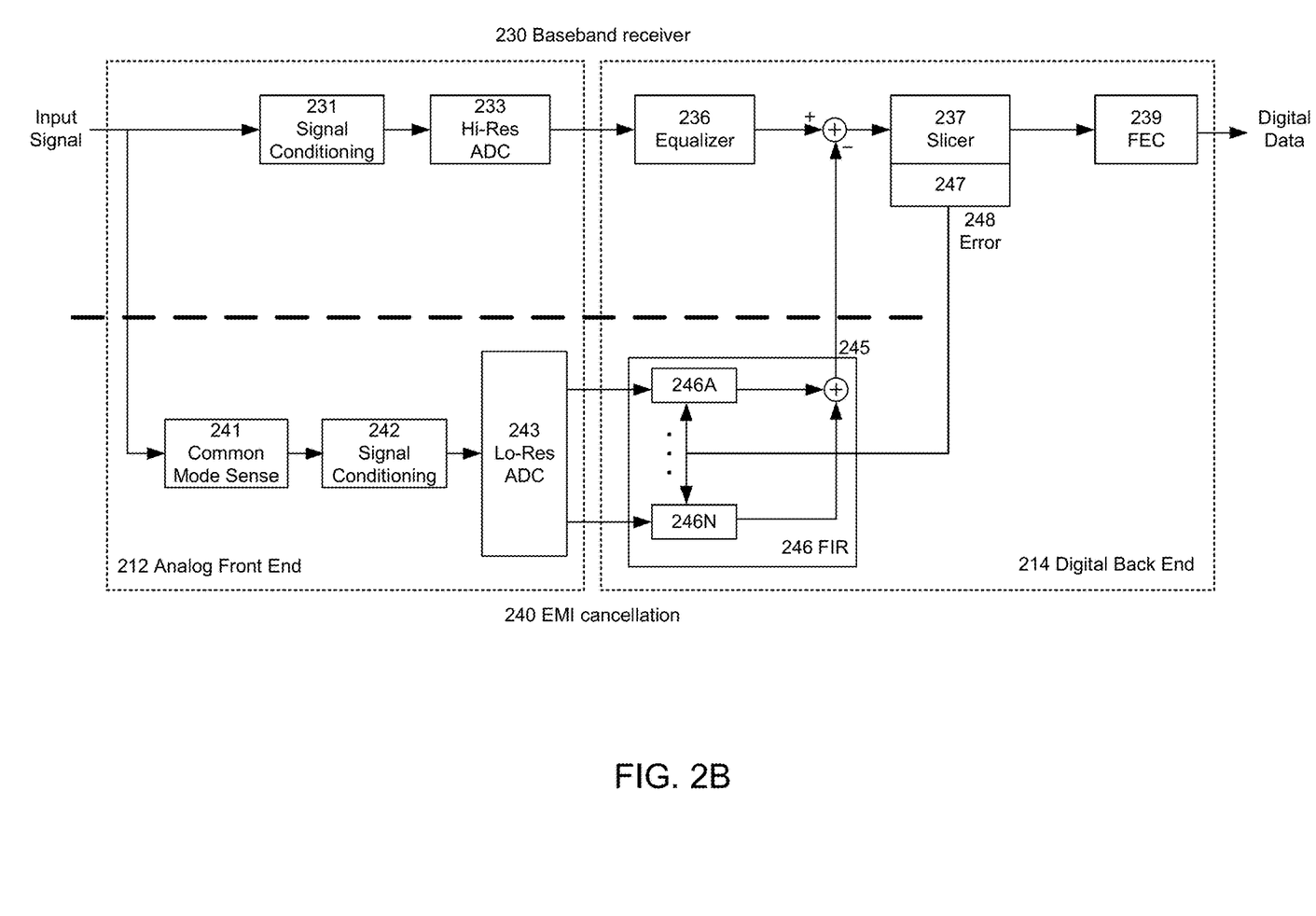
Figure 2C:
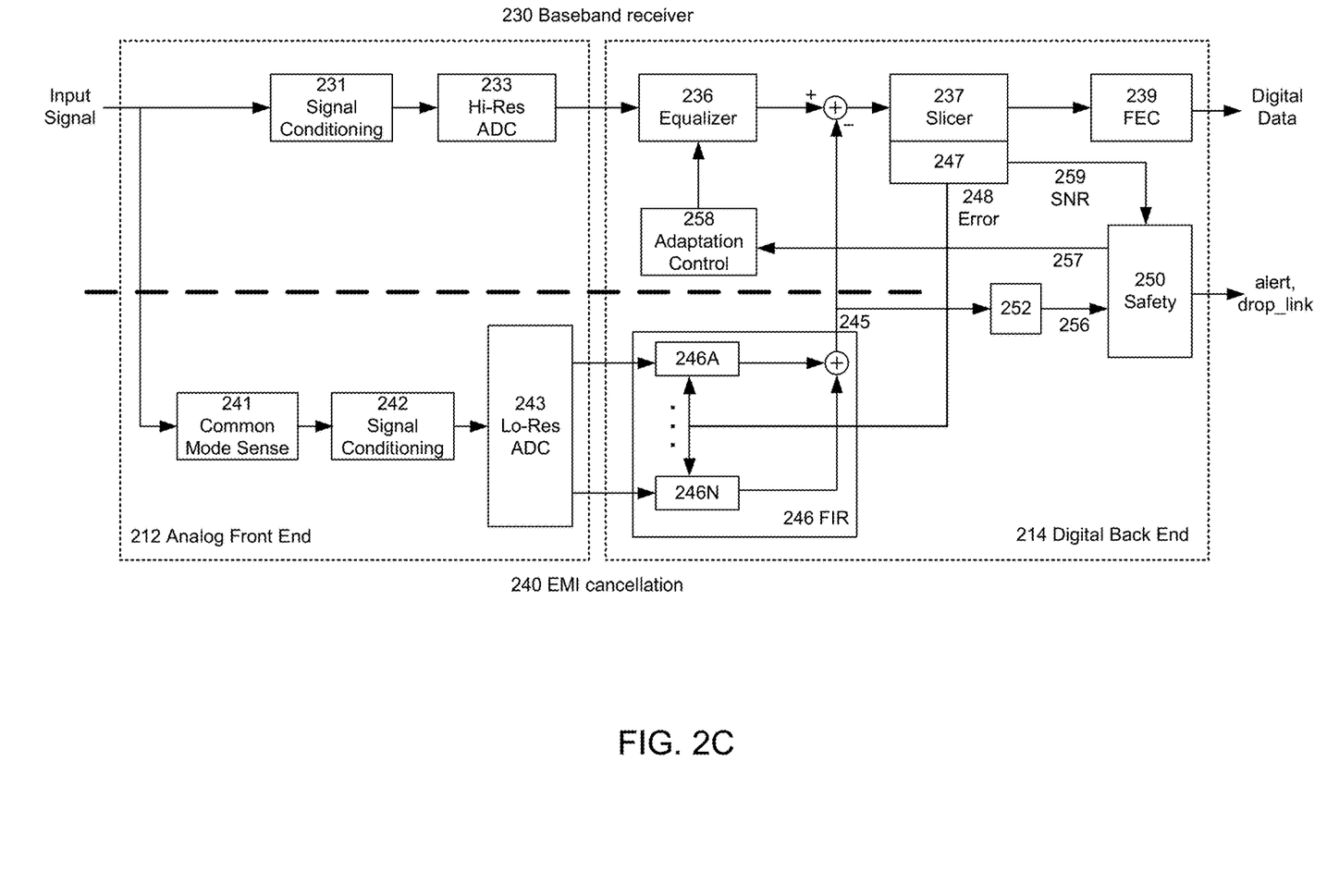

FIGS. 2A-2C are a block diagram of an example implementation of a baseband receiver with EMI mitigation. FIG. 2A shows just the baseband receiver 230. FIG. 2B adds the EMI cancellation circuitry 240, which is mostly below the dashed line while the baseband receiver 230 is above the dashed line. FIG. 2C adds safety functionality. In this example, the functionality shown in FIGS. 2A-2C is implemented as a single mixed signal receiver chip with an analog front end 212 and a digital back end 214 which includes signal processing and a state machine for the functional safety 250, although this is not required. For example, the analog 212 and digital 214 functions may be implemented in separate chips. Furthermore, the safety function 250 (shown in FIG. 2C) may be implemented in another chip, such as a CPU running a software version of the safety state machine with the CPU controlling the adaptation control 258 via register writes and getting interrupts (or polling) the RFI detection signal 256 and SNR 259. The receiver has input pins for the baseband receiver 230 but does not have separate pins for the EMI cancellation 240, thus saving on pin count. The receiver uses differential signaling, so the incoming signal is a differential pair of signals.

FIG. 2A shows the baseband receiver 230. The analog/mixed signal components include analog signal conditioning circuitry 231. Examples includes passive and active analog filters, low-noise amplifier (LNA), programmable-gain amplifier (PGA), linear attenuators, dc-blocking, baseline-wander correction circuit, and signal clamping circuit. This is followed by a high resolution analog to digital converter 233, which converts the incoming analog signal to digital for the digital back end.

The sample rate of the ADC 233 depends on the data transmission rate over the communications link. The sample rate may vary widely, for example from 125 MHz to 6 GHz and higher. The sample rate and data transmission rate is also related to EMI effects. For example, if the receiver is running at 125 MHz, EMI from a 1 GHz RFI tone will be filtered out by the basic receiver functionality and does not require special EMI cancellation, but EMI from a 50 MHz tone would more likely require cancellation as described below. Conversely, if the receiver is running at 6 GHz, then the 1 GHz EMI is more problematic and the 50 MHz EMI is less problematic.

The ADC 233 is followed by an equalizer 236 for receiver equalization, for example a feed forward equalizer. The equalized output then goes through a slicer 237 which quantizes the received signal. The filter coefficients for the equalizer 236 are adaptive and trained to settle on a setting to undo the signal distortions in the channel. If the digital data is protected with forward error correction (FEC) code, FEC circuitry 239 may correct a certain level of bit error coming out of the slicer 237. The incoming input signal is an analog differential signal. The ADC 233 converts this incoming analog differential signal to sampled digital form. The signal is differential up to the input of the ADC 233 and it is digital numbers after that.

When EMI noise interferes with the normal received signal, both signal and noise will flow through the equalizer 236 and the EMI noise will distort the equalizer output. A conventional approach of dealing with the EMI is to adapt the equalizer 236 so that it notches out the noise, but this notching will also attenuate the good signal and lower the signal to noise ratio (SNR).

FIG. 2B shows additional EMI cancellation circuitry 240. An EMI signal generally manifests itself on the main data transmission channel in two forms to PHY receiver ends— predominantly as a common-mode signal and lesser but more problematically as a differential signal through various mode conversion mechanisms along the data signal propagation. Some examples of mode conversion include imbalance in wire pairs, uneven winding of wires in a common mode choke, and uneven termination impedances. EMI manifested as common-mode signal could be attenuated by a common mode choke (CMC) and then rejected by a receiver using differential signaling method. However, EMI manifested as differential signal is not suppressed by a CMC and presents as an error signal superimposed on the desired transmitted data signal to a differential receiver, in addition to signal distortions from the channel.

A dedicated auxiliary EMI sensing receiver may be used to detect common-mode movement in the signal. Its function is complementary to that of the main receiver by sensing only common-mode perturbation and rejecting differential signal. In a typical conventional solution, the CMC is located off-chip before the input pins to the analog front end 212. The EMI sensing receiver would tap the signal before the CMC where the common-mode signal energy is larger. However, that would require one or more dedicated ports for the EMI sensing receiver, which adds pins and more circuitry. The approach shown in FIG. 2 eliminates extra sense ports by sensing the EMI directly at the main signal ports and having both the main and EMI signal paths implemented in the same package or monolithically on the same chip. This requires a higher level of sensitivity in extracting the EMI signal. With higher sensitivity provided by the EMI cancellation, the external CMC may also become unnecessary. For example, it may be used in an unshielded transmission environment but eliminated for a shielded transmission medium. The single chip solution also provides an economic advantage and ease of integration.

Figure 3:
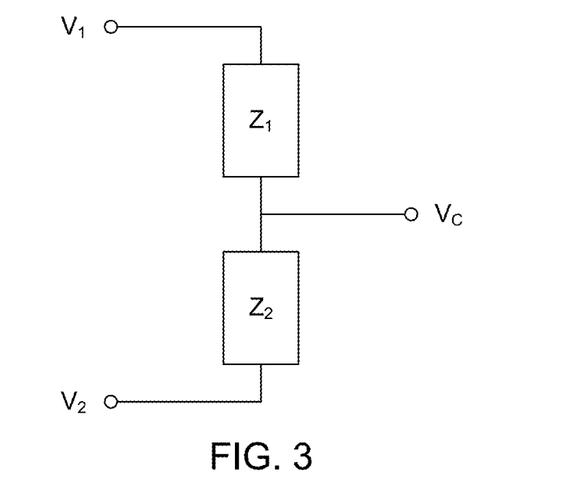
FIG. 3 is a block diagram of an example implementation of common mode sense circuitry.

In FIG. 2B, common-mode sense circuitry 241 extracts the common-mode signal at the main differential signal ports, for example by summing the two differential signals in voltage, current or charge domain. If a CMC is used, the CMC typically is located before the analog front end 212 and the common-mode sense circuitry 241 taps the signal after the CMC. FIG. 3 is a block diagram of an example of common-mode sense circuitry 241. The two differential signals are voltages $V_1$ and $V_2$. The output voltage $V_C$ is given by $$V_C = (V_1 Z_2 + V_2 Z_1)/(Z_1 + Z_2) \quad (1)$$

Impedances $Z_1$ and $Z_2$ may be implemented by passive and/or active elements. Passive elements could be but are not limited to poly or diffusion resistors, MiM (metal-insulator-metal) or fingered-MOM (metal-oxide-metal) capacitors. Active elements could be transistors biased in triode region or highly matched current sources.

If the impedances $Z_1$ and $Z_2$ are identical, then the output $V_c = (V_1 + V_2)/2$ which is the correct desired common-mode of the signal. However, if the impedances $Z_1$ and $Z_2$ are mismatched, the common-mode signal $V_c$ will have error. Since detection is done at the main signal ports, there is high sensitivity to mismatches in the detecting elements $Z_1$ and $Z_2$ of the common-mode extractor 241. There are systematic and random variations even in the most advanced technology processes. One simple example would be linear (or higher order) gradient effect due to uneven doping density or polishing that could cause resistance variation across physical locations on a silicon wafer. When there is a difference in $Z_1$ and $Z_2$, even though $V_1$ and $V_2$ are perfectly differential signals with equal amplitude but opposite phase, this differential signal component could erroneously appear as common-mode signal through mode conversion, thus corrupting common-mode detection.

Figure 4A:
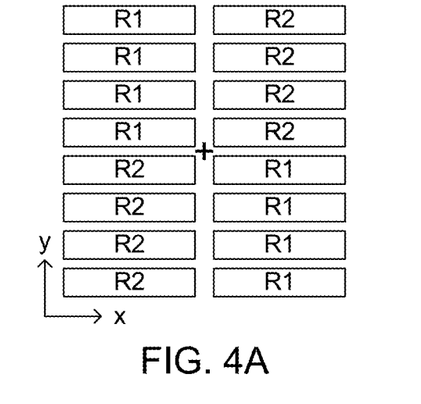
FIG. 4A shows a physical layout of two groups of resistors with a common centroid.
Figure 4B:
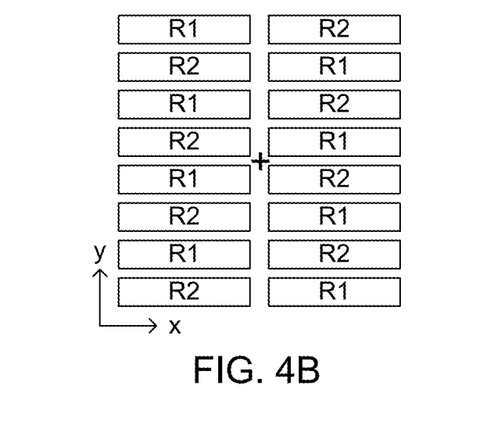
FIG. 4B shows a physical layout of two groups of interdigitated resistors.

One way to meet the high sensitivity required is by using high-precision passive or active elements proportionally and highly matched by placing them in interdigitated and/or common-centroid fashion in the physical layout. FIG. 4A shows a physical layout of resistors on chip, where the arrangement has a common centroid. The common centroid is marked by the "+". The x and y dimensions are perpendicular directions along the chip surface. The resistors R1 are connected in a circuit to form impedance $Z_1$ and the resistors R2 are connected in the same manner to form impedance $Z_2$. Because the group of resistors R1 has the same common centroid as the group of resistors R2, variations across the chip will tend to cancel between the two groups so that $Z_1$ and $Z_2$ are matched despite variations across the chip. FIG. 4B shows a physical layout where the resistors R1 and R2 are interdigitated (alternated) in the physical layout. This layout will also reduce mismatch of $Z_1$ and $Z_2$ due to variations across the chip.

Returning to FIG. 2B, once the EMI signal is extracted from the main input ports as common-mode signal using an on-chip common-mode detector 241, it is further amplified and processed by analog signal conditioning circuitry 242 operating on signal transition edges. Circuitry 242 may provide signal amplification, filtering, and clamping, for example. The signal is subsequently digitized by a low-resolution oversampling ADC 243. The ADC 243 oversamples relative to the ADC 233. That is, the ADC 243 produces multiple samples for each sample of the ADC 233. For example, ADC 243 could be a 1-bit ADC that samples at N times the sample rate of ADC 233. Alternatively, as shown in FIG. 2B, ADC 243 could be implemented as N 1-bit ADCs that each sample at the same rate as ADC 233 but offset by 1/N cycles relative to each other. For oversampling, N≥2. The ADC 243 is low-resolution compared to ADC 233. Typically, the low-resolution ADC 243 will have 1-3 bits of resolution. The digitized output of ADC 243 contains EMI information in the form of timing or frequency that the downstream digital signal processor (DSP) in back end 214 uses as a reference for EMI cancellation.

The approach of FIG. 2B processes on and conveys transition or edge information of the EMI signal, rather than trying to capture and maintain the linear power and amplitude information of the EMI signal. This simplifies the EMI front-end receiver design 241-243. Analog signal conditioning 242 in the EMI cancellation branch does not rely on maintaining EMI signal linearity over large dynamic range but works on the signal transition edges to retain its fundamental frequency information. Compared to EMI signal conditioning that tries to preserve the signal fidelity of the sensed EMI signal through linear amplification, the analog front-end 241-243 in FIG. 2B does not require highly linear analog circuits such as amplifier, filter and high-resolution ADC. This, in turn, saves power and area and reduces system complexity.

One possible implementation of the EMI receiver front-end 241-243 is to immediately convert the sensed common-mode signal into a differential signal. Analog signal processing 242 in differential format naturally provides its zero crossings as reference as well as better power supply rejection. The signal may then be amplified by a simpler low-gain amplifier, possibly followed by a fast clamping or limiter circuits, then ultimately sampled and digitized by one or more single-bit quantizers running at an oversampled rate. With the help of advanced deep submicron silicon process technology, 1-bit low-noise quantizers clocked at multi GHz are achievable and are capable of regenerating and amplifying low signals near differential zero into full rail-to-rail digital bits with high precision and power efficiency.

Figure 5:
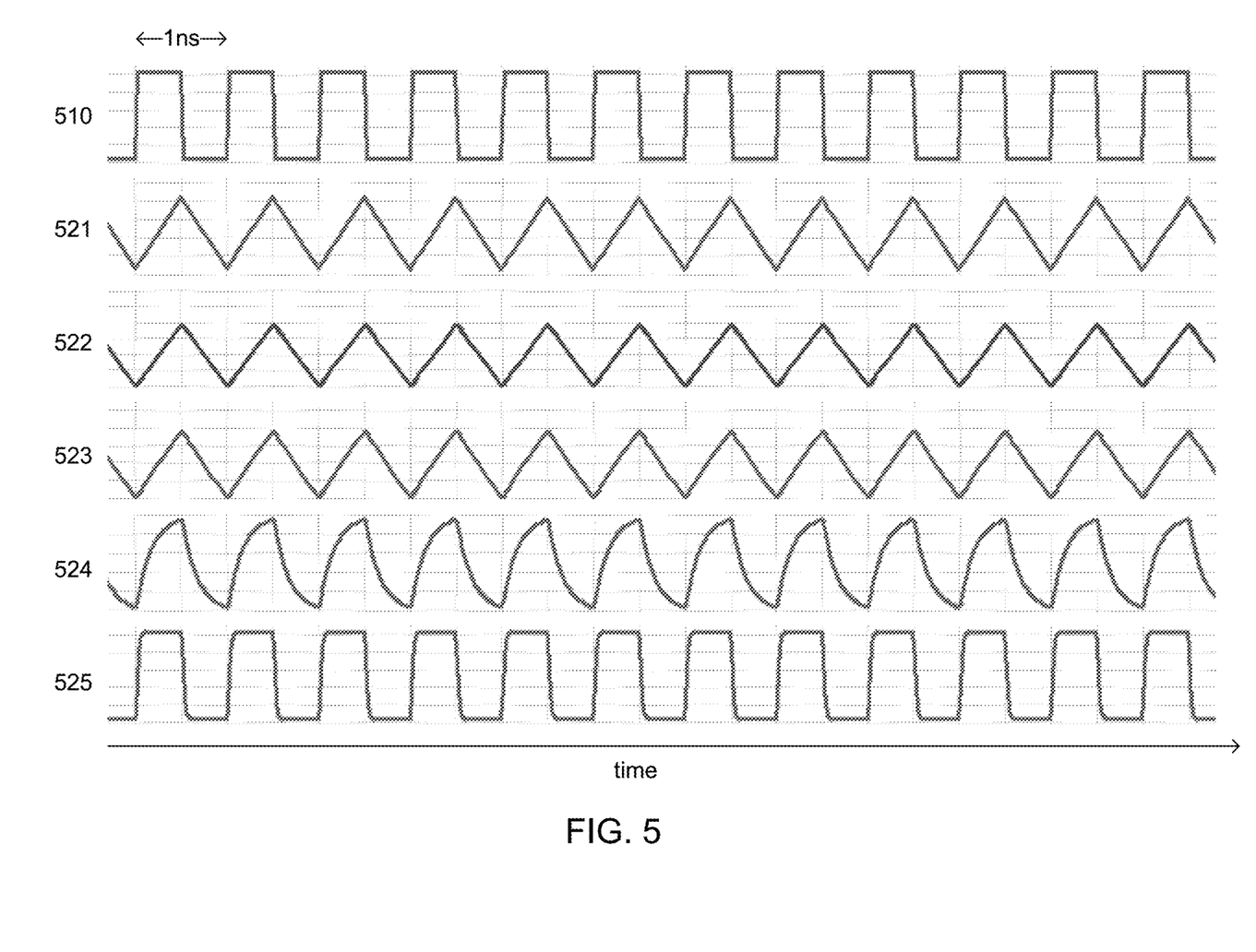
FIG. 5 shows an RFI pulse response at 1 GHz, as filtered through first-order low-pass filters of different bandwidths.

RFI signals tend to be more coherent in frequencies and typically dominated by the carrier signal of an interfering source in the proximity. FIG. 5 depicts output waveforms of 1 GHz RFI pulses subjected to a simple RC low-pass filter with various cutoff frequencies from 1 MHz to 10 GHz. The top waveform 510 is the input waveform of 1 GHz RFI pulses, with a fundamental period of 1 ns. Waveform 521 is the output after filtering by a 1 MHz RC low-pass filter. Waveforms 522-525 are the outputs after filtering by 10 MHz, 100 MHz, 1 GHz, and 10 GHz RC low-pass filters, respectively. The signal power may be degraded in the low-bandwidth outputs, but the fundamental frequency of the RFI signal is maintained. The same holds true for RFI signal at various frequencies over a fixed channel.

This periodicity may be exploited to simplify an RFI detector to simply detecting the frequencies of interfering common-mode signals. 1 bit or low-resolution quantizers could be used to capture the transition edges and appropriate oversampling rate is used to determine the range of RFI frequency of interest. The information could then be relayed as a reference signal to the DSP in the normal receive path 230 and exact power of the interferer could be extracted and cancelled out using intelligent signal processing, for example as described below.

In FIG. 2B, the output of the analog receiver 241-243 contains sampled and digitized signals that contain EMI information. These signals are fed to the adaptive FIR filter 246. The coefficients of the FIR filter are adapted to minimize the mean square error of the error signal. In this example, circuitry 247 generates an error signal 248 based on the slicer 237 operation. The slicer 237 receives an input signal and slices the input to a finite number of output levels, based on thresholds used by the slicer. The difference between the input signal and the permitted slicer output levels is the error signal 248.

In FIG. 2B, the adaptive FIR filter 246 is implemented as follows. The oversampling ADC 243 produces N samples that are offset by 1/N cycles. These N digital streams are received by N FIR filters 246A-N with the samples offset by 1/N cycles. Any values of N may be used, including N=1, to trade off complexity versus performance. For example, if N=4, then each of the samples are offset by a quarter cycle. The output of each FIR is added and then subtracted from the equalizer 236 output. The oversampling mitigates erroneous adaptation when RFI frequency and phase are in a certain relationship relative to the ADC 233 clock. When N=2 or higher, the oversampling guarantees at least one FIR input has a strong signal in cases when one of the sampled inputs is near a zero crossing (hence a weaker signal).

The EMI cancellation circuit 240 replicates the sampled EMI noise as EMI cancellation signal 245 and then subtracts this from the output of the equalizer 236 output before going into the slicer 237. Since the cancellation is not done inside the equalizer 236, the good signal does not suffer the effects of being attenuated.

Different types of adaptation may be used for the adaptive components equalizer 236 and FIR 246. Different types of adaptive components may also be used. One algorithm is minimum mean square error (MMSE), which optimizes signal to noise ratio (SNR) performance at the data slicer input. Another algorithm is zero-forcing algorithm (ZF), which removes inter symbol interference (ISI) independent of noise. The combination of these algorithms can be used for the system performance optimization depending to the noise and channel loss.

In the example of FIG. 2B, MMSE is used to adapt the RFI canceller 240 and ZF is used to adapt the baseband receiver 230. If the baseband receiver 230 and EMI canceller 240 use the same algorithm, they may fight each other when optimizing the filter coefficients. Using MMSE for one and ZF for the other significantly reduces or eliminates the fighting. Hence, system performance can be maintained in a harsh RFI environment.

Figure 6:
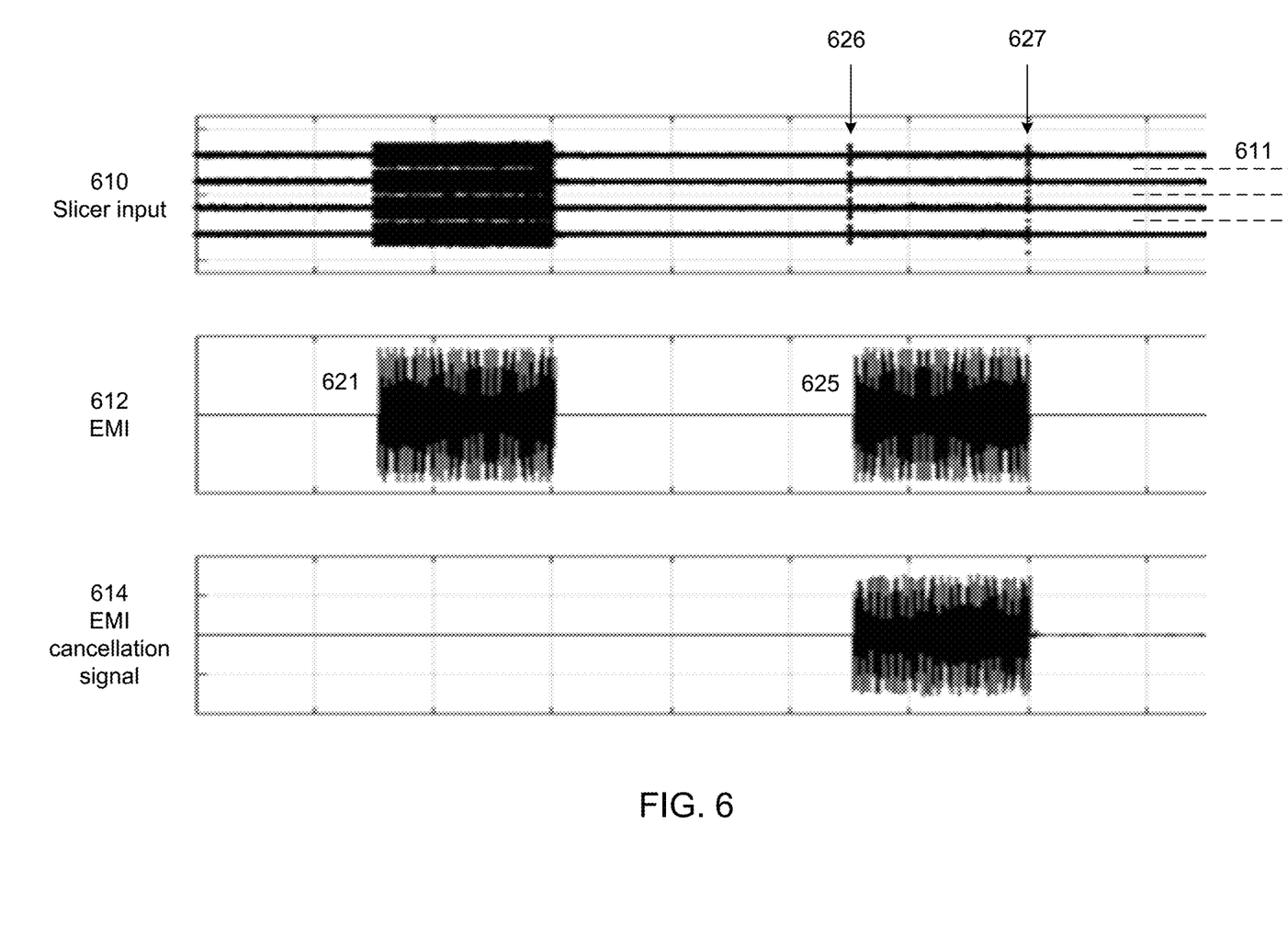
FIG. 6 shows cancellation of RFI bursts.

FIG. 6 illustrates operation of the EMI cancellation. FIG. 6 shows three plots 610, 612, 614 of various signals over time. In this example, the signal is a 4-level signal. Plot 610 shows sampled signals at the input of the slicer 237. The signals are concentrated around the 4 signal levels. When equalized properly, the input signal can be properly assigned to one of the 4 levels by the slicer 237 comparing the input signal against the thresholds 611 shown by the dashed lines. The second plot 612 shows the EMI noise that is coupled in. Note that this noise is not directly observable on its own, other than being coupled in with the good signal and is shown here for reference only. The third plot 614 is the output of the EMI canceller 240, which is the EMI cancellation signal.

There are two EMI bursts 621, 625. The first burst 621 is not cancelled while the second burst 625 is cancelled. Without cancellation, the input 610 to the slicer is corrupted for the duration for the burst 621. With cancellation, the corruption only occurs for a short period at the start 626 and end 627 of the burst, since it takes some finite time to detect and adapt the filters when the EMI burst starts and ends.

If the signal is protected with forward error correction (FEC) code, the corruption at the beginning 626 and end 627 of the burst can be corrected. Note that FEC 239 can only correct errors for a limited duration. Hence, the burst protection capability of the FEC and the adaptation time of the EMI canceller 240 are matched so that the FEC burst protection is longer than the EMI canceller adaptation time.

As shown in plot 614, the output of the EMI canceller 240 is an easily observable signal in the system. This signal can be used as a proxy for the presence of EMI and can be used to enhance functional safety by giving an early alert that a given link is being exposed to excessive EMI. This early alert will give the system time to compensate for possible failure (e.g., switching to alternative sensor or other components, putting the system into a safe state, etc.). On the other hand, the system should not set off false alarms since the link will be exposed to some EMI from time to time.

FIG. 2C adds safety functionality to the receiver chip. In this example, safety circuitry 250 implements a state machine, as described in further detail below, although other approaches may also be used. An EMI detection signal 256 (e.g., variable rfi_active in Table 2 below) is provided as input to the safety circuitry 250. Monitoring circuitry 252 converts the EMI cancellation signal 245 to EMI detection signal 256 by comparing against a threshold. If the EMI cancellation signal 245 is above a threshold, then the EMI detection signal 256 is set. The state machine 250 also takes SNR 259 as an input (e.g., variables good SNR and low SNR in Table 2 below). The SNR may be computed from the square of error 248, with the corresponding variables determined by thresholding. Circuitry 258 is used to control adaptation of the equalizer 236, for example turning the adaptation on or off based on control signal 257 from the safety circuit 250.

Figure 7:
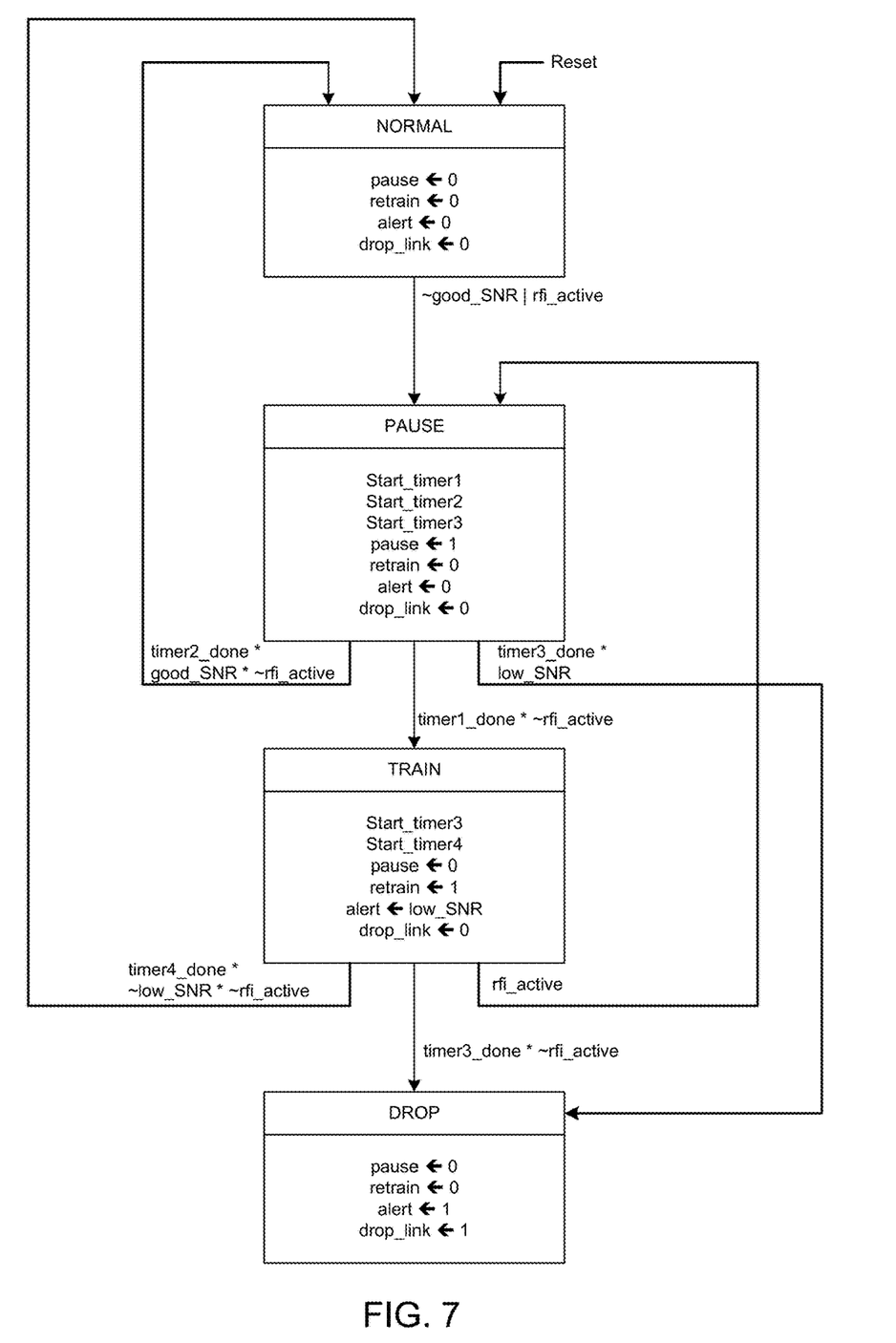
FIG. 7 is a safety state diagram.

FIG. 7 shows the state diagram of the state machine 250. The stage diagram implements the following safety functions:

Temporarily stops adaptive filters in equalizer 236 from training when EMI is present, so as not to train on a noisy signal. This reduces SNR degradation that occurs when adapting on noisy data.

Send an alert ("alert" output in FIG. 2C) to give early warning that EMI may be exceeding the limits of what the EMI canceller 240 can compensate.

Disable the link ("drop_link" output in FIG. 2C) to prevent propagation of erroneous data if EMI noise that cannot be canceled to a sufficient degree remains present for an excessive amount of time.

The state diagram of FIG. 7 uses the states listed in Table 1.

TABLE 1

States for Safety Function State Machine

| State | Description |
| --- | --- |
| NORMAL | Normal operation. Link is transmitting. Equalizer is adapting. No EMI detected or EMI cancellation is sufficient. |
| PAUSE | Pause adaptation of equalizer. |
| TRAIN | Force retraining of equalizer. |
| DROP | Stop link transmission. |

State transitions are governed by the variables listed and defined in Table 2.

TABLE 2

Variables for Safety Function State Machine

| Variable | Description |
| --- | --- |
| Reset | True = Initialize state machine<br>False = Start monitoring |
| good_SNR | True = Acceptable SNR level (i.e., link has sufficient operating margin)<br>False = else |
| low_SNR | True = Marginal or unacceptable SNR level<br>False = else<br>Note that if both good_SNR and low_SNR are False, then the SNR is bad |
| rfi_active | True = the output of the EMI canceller exceeds a certain threshold. The threshold may be programmable, depending on the sensitivity of declaring an EMI event.<br>False = else |
| pause | True = stop receiver filter adaptation<br>False = run normally |
| retrain | True = force receiver filter adaptation<br>False = run normally |
| alert | True = early indication of excessive EMI exposure<br>False = no excessive exposure |
| drop_link | True = break the link to stop propagation of bad data<br>False = normal operation |
| timers 1, 2, 4 | Various timers, which may be programmable |
| timer 3 | Drop link timer, which may be programmable |

FIG. 7 is interpreted as follows. The text inside each state shows the actions taken for that state. In the NORMAL state, pause is set to 0 (False), retrain is set to 0, etc. In the PAUSE state, timers 1, 2, 3 are started, pause is set to 1, retrain is set to 0, etc. The state transitions are triggered by the variable combinations shown. For example, the state transitions from NORMAL to PAUSE upon ~good_SNR|rfi_active, which is (good SNR=0 OR rfi_active=1). "|" means OR, "*" means AND, and "~" means NOT.

In normal operation without EMI, the state machine is in the NORMAL state. Once EMI activity is detected (rfi_active=1) or good SNR is lost (good SNR=0), the state machine moves into the PAUSE state. Here adaptation of the equalizer is paused to prevent training on noisy data. In FIG. 2C, this is achieved by sending a signal 257 to adaptation control 258, which then turns off adaptation of the equalizer 236. After some timer2 time, if poor SNR and EMI activity are no longer present, the state machine goes back to the NORMAL state. Otherwise, if timer1 is done and EMI activity is no longer present then the state machine moves to the TRAIN state. Otherwise, if timer3 is done and SNR is low, the state machine moves to the DROP state.

In the TRAIN state, the EMI noise should not be present and the equalizer is forced to adapt since the SNR is not good. An early warning (alert) will be sent if the SNR is low in this state. If EMI activity is seen, the state machine moves back to the PAUSE state. Otherwise, if timer4 is done and the SNR is at least not low, the state machine moves to the NORMAL state. Otherwise, if timer3 is done, the state machine moves to the DROP state.

In the DROP state, the link is broken preventing erroneous data from being received.

Note that the safety function may be implemented using techniques other than a finite state machine. The safety function may also be implemented independently of the EMI cancellation. In that case, the circuitry used to monitor for EMI could include components 241-246 or simplified versions of those components. In FIG. 2C, much of the circuitry shown 241-246 is used for both EMI cancellation and for monitoring.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A receiver chip for wireline communication using baseband transmission, the receiver chip comprising:
   a baseband receiver configured to receive an input signal transmitted over a wireline link, wherein the input signal is encoded with digital data and the baseband receiver recovers the digital data from the received input signal;
   EMI cancellation circuitry configured to receive the input signal and to produce from the input signal an EMI cancellation signal, wherein the EMI cancellation signal is an estimate of EMI in the received input signal and is used by the baseband receiver to reduce an effect of the EMI on recovering the digital data;
   EMI monitoring circuitry that produces an EMI detection signal from the EMI cancellation signal, wherein the EMI detection signal is indicative of a presence of EMI in the received input signal; and
   safety circuitry coupled to the EMI monitoring circuitry and to the baseband receiver, wherein the safety circuitry alters operation of the baseband receiver upon the EMI detection signal indicating a presence of EMI.

2. The receiver chip of claim 1 wherein the baseband receiver is adaptive, and the safety circuitry stops adaptation of the baseband receiver upon the EMI detection signal indicating the presence of EMI.

3. The receiver chip of claim 2 wherein the safety circuitry initiates adaptation of the baseband receiver upon the EMI detection signal no longer indicating the presence of EMI.

4. The receiver chip of claim 2 wherein the safety circuitry allows adaptation of the baseband receiver upon the EMI detection signal no longer indicating the presence of EMI.

5. The receiver chip of claim 1 wherein the safety circuitry further generates an alert upon the EMI detection signal indicating the presence of EMI.

6. The receiver chip of claim 1 wherein the safety circuitry implements a state machine.

7. The receiver chip of claim 6 wherein the state machine includes a NORMAL state for normal transmission over the wireline link, and a PAUSE state for pausing adaptation of the baseband receiver.

8. The receiver chip of claim 7 wherein the state machine further includes a TRAIN state for forcing adaptation of the baseband receiver.

9. The receiver chip of claim 1 wherein the safety circuitry alters operation of the baseband receiver upon an indication that the EMI cancellation circuitry is operating close to a cancellation limit.

10. The receiver chip of claim 1 wherein the input signal comprises a differential input signal, a common mode noise induces coupled noise in the differential input signal, and the EMI cancellation circuitry extracts the coupled noise from the differential input signal.

11. The receiver chip of claim 1 wherein the input signal comprises a differential input signal, and the EMI cancellation circuitry comprises:
   a common mode sense circuit that extracts a common mode signal from the differential input signal;
   an adaptive filter that produces the EMI cancellation signal from the common mode signal; and
   a feedback loop from the baseband receiver to the adaptive filter.

12. A receiver chip for wireline communication using baseband transmission, the receiver chip comprising:
   a baseband receiver configured to receive an input signal transmitted over a wireline link, wherein the input signal is encoded with digital data and the baseband receiver recovers the digital data from the received input signal;
   EMI monitoring circuitry that produces an EMI detection signal from the received input signal, wherein the EMI detection signal is indicative of a presence of EMI in the received input signal; and
   safety circuitry coupled to the EMI monitoring circuitry and to the baseband receiver, wherein the safety circuitry alters operation of the baseband receiver upon the EMI detection signal indicating a presence of EMI, and wherein the safety circuitry initiates shut down of the wireline link upon the EMI detection signal indicating the presence of EMI and the baseband receiver indicating unacceptable quality of digital data recovery.

13. A receiver chip for wireline communication using baseband transmission, the receiver chip comprising:
   a baseband receiver configured to receive an input signal transmitted over a wireline link, wherein the input signal is encoded with digital data and the baseband receiver recovers the digital data from the received input signal;
   EMI monitoring circuitry that produces an EMI detection signal from the received input signal, wherein the EMI detection signal is indicative of a presence of EMI in the received input signal; and
   safety circuitry coupled to the EMI monitoring circuitry and to the baseband receiver, wherein the safety circuitry alters operation of the baseband receiver upon the EMI detection signal indicating a presence of EMI, and wherein the safety circuitry implements a state machine and state transitions of the state machine depend on a set of variables that indicate whether transmission quality is acceptable, whether EMI is present, and whether EMI cancellation is sufficient.

14. A method for wireline communication using baseband transmission, the method comprising:
   receiving an input signal transmitted over a wireline link, wherein the input signal is encoded with digital data;

producing an EMI cancellation signal that is an estimate of EMI in the received input signal;

producing an EMI detection signal from the EMI cancellation signal, wherein the EMI detection signal is indicative of a presence of EMI in the received input signal;

recovering the digital data from the received input signal, comprising using the EMI cancellation signal to reduce an effect of the EMI on recovering the digital data; and altering recovery of the digital data upon the EMI detection signal indicating a presence of EMI.

15. The method of claim 14 wherein recovering the digital data is adaptive and altering recovery of the digital data comprises stopping adaptation upon the EMI detection signal indicating the presence of EMI.

16. The method of claim 14 further comprising:

generating an alert upon the EMI detection signal indicating the presence of EMI.

17. The method of claim 14 further comprising:

initiating shut down of the wireline link upon the EMI detection signal indicating the presence of EMI and an unacceptable quality of the digital data recovery.

18. The method of claim 14 wherein altering recovery of the digital data is based on states of a state machine, and state transitions of the state machine depend on a set of variables that indicate whether transmission quality is acceptable, whether EMI is present, and whether EMI cancellation is sufficient.

19. The method of claim 14 wherein the input signal comprises a differential input signal, a common mode noise induces coupled noise in the differential input signal, and producing the EMI cancellation signal comprises extracting the coupled noise from the differential input signal.

20. The method of claim 19 wherein recovering the digital data is adaptive, and altering recovery of the digital data comprises stopping the adaptation upon the EMI detection signal indicating the presence of EMI.

* * * * *